United States Patent
Nickell et al.

(10) Patent No.: US 8,562,440 B2
(45) Date of Patent: *Oct. 22, 2013

(54) METHOD, APPARATUS, AND PROGRAM PRODUCT FOR MODELING PRESENCE IN A PERSISTENT VIRTUAL ENVIRONMENT

(75) Inventors: Eric S. Nickell, Los Gatos, CA (US); Nicolas B. Ducheneaut, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1751 days.

This patent is subject to a terminal disclaimer.

(21) Appl. No.: 11/320,225

(22) Filed: Dec. 28, 2005

(65) Prior Publication Data

US 2007/0149290 A1 Jun. 28, 2007

(51) Int. Cl.
*A63F 9/24* (2006.01)
*A63F 13/00* (2006.01)
*G06F 17/18* (2006.01)

(52) U.S. Cl.
USPC ............... 463/42; 463/40; 463/41; 709/204; 706/21

(58) Field of Classification Search
USPC ............ 463/40–42; 709/204; 706/21
See application file for complete search history.

(56) References Cited

U.S. PATENT DOCUMENTS

| 2003/0069868 A1* | 4/2003 | Vos ................................ 706/45 |
| 2004/0003042 A1* | 1/2004 | Horvitz et al. ................ 709/204 |
| 2004/0039630 A1* | 2/2004 | Begole et al. .................. 705/11 |

OTHER PUBLICATIONS

Arsham, Hossein, "Time-Critical Decision Making for Economics and Finance", Apr. 4, 2004, downloaded on Jun. 9, 2011, available at <http://web.archive.org/web/20040404133153/http://home.ubalt.edu/ntsbarsh/stat-data/Forecast.htm>.*
Fok, Carlotta Ching Ting and James Ramsay, "Periodic Trends, Non-Periodic Trends, and Their Interactions in Longitudinal and Functional Data", 2003, Department of Psychology, McGill University, available at <www.psychometrika.org/meeting/2003/papers/ching-ting-fok.pdf>.*
Cambridge University Press © 1988-1992, *Numerical Recipes C: The Art of Scientific Computing*, pp. 656-657. (ISBN 0-521-43108-5).
Cambridge University Press © 1988-1992, *Numerical Recipes C: The Art of Scientific Computing*, pp. 671-681, (ISBN 0-521-43108-5).

* cited by examiner

*Primary Examiner* — David Lewis
*Assistant Examiner* — Werner Garner
(74) *Attorney, Agent, or Firm* — Shun Yao; Park, Vaughan, Fleming & Dowler LLP

(57) ABSTRACT

Apparatus, methods, and computer program products are disclosed that accumulate a presence history of an entity within a persistent virtual environment by repeated gathering of virtual presence information. The virtual presence information includes an entity identification value and a sampling time value. Once the virtual presence information is collected, the technology performs a general least-squares-fit to a set of basis functions on a portion of the presence history to create a coefficient vector. The coefficient vector represents a temporal profile consistent with the presence history and includes coefficients responsive to the general least-squares-fit. Once the coefficient vector is created, the technology characterizes the entity responsive to its coefficient vector and presents the characterization of the entity.

27 Claims, 12 Drawing Sheets

METHOD, APPARATUS, AND PROGRAM PRODUCT FOR MODELING PRESENCE IN A PERSISTENT VIRTUAL ENVIRONMENT

CROSS-REFERENCE TO RELATED APPLICATIONS

The following United States Patent Applications have been filed herewith: U.S. patent application Ser. No. 11/320,224, having the same inventors, entitled Method, Apparatus, and Program Product for Predicting Virtual Presence in a Persistent Virtual Environment; and U.S. patent application Ser. No. 11/319,902, having the same inventors, entitled Method, Apparatus, and Program Product for Clustering Entities in a Persistent Virtual Environment.

STATEMENT REGARDING FEDERALLY SPONSORED RESEARCH OR DEVELOPMENT (NOT APPLICABLE)

INCORPORATION-BY-REFERENCE OF MATERIAL SUBMITTED ON A COMPACT DISC (NOT APPLICABLE)

BACKGROUND

1. Technical Field

The disclosed technology relates to the field of persistent virtual environments.

2. Background Art

Massively Multiplayer Online Games (MMOGs) are becoming increasingly popular with subscribers in the millions. In many of these games (especially in the role-playing subgenre, Massively Multiplayer Online Role Playing Games (MMORPGs)), an online social relationship is established between avatars controlled by separate players (and sometimes the online social relationship transfers to the players themselves—although a player can have a stable of avatars that can be played to have significantly different personas). The establishment of these online social relationships is an important part of the game experience. Thus, MMOGs are often designed to encourage interactions between avatars. Some of these interaction encouraging techniques include providing support for guilds, clans, cities, professions, or other player association, built in delays to encourage inter-avatar interaction, and for "friend" or "enemy" lists. This support includes the ability to know which entities that have an established online social relationship are virtually present in the persistent virtual environment at the same time.

A player may wish to have his/her avatar propose a joint activity with another player's avatar to establish or maintain an online social relationship. Player associations often organize shared adventures for the avatars in the association. One of the difficulties with establishing online social relationships is that players in the "real-world" have work, family, and other obligations that affect when their avatars can be virtually present and controlled by the players (some MMOGs allow an avatar to be controlled by a program or macro that allow the avatar to be present in the persistent virtual environment, but without any meaningful ability to establish or maintain an online social relationship—thus, the player is not virtually present). In addition, players from any real-world time zone can login to the persistent virtual environment at some real-world time zone time. Once logged in, their avatars are subject to the virtual time in the MMOG. Thus, a player from New York who works during the daytime will find it difficult to develop an online social relationship with a player from Paris who works during the daytime.

It is difficult to establish or maintain an online social relationship between avatars who are not predictably virtually present in the persistent virtual environment at the same game-time. Further the MMOGs do not provide any mechanism to allow one player to know which avatars are usually virtually present with the player.

It is also difficult to schedule time to maintain an online social relationship as one player has no automatic way of knowing when another player is likely to be virtually present. Thus, the players must coordinate future interactions via in-game chat when the players are virtually present or via in-game email.

Published United States Patent Application No. U.S. 2004/0039630 A1 entitled Method and System for Inferring and Applying Coordination Patterns from Individual Work and Communication Activity to Begole et al. teaches gathering real-world information that allows them to infer that a person is following a cycle. In comparison, the technology disclosed herein tracks when a player is virtually present, assumes that the player follows a virtually present cycle, and analyzes the strength of the cycle to determine its ability to predict whether a player will be virtually present in the future.

It would be advantageous to capture a player's temporal profile within the persistent virtual environment and to be able to help a player find other entities who have temporal profiles that match the player's temporal profile to simplify the establishment of online social relationships. In addition, it would be advantageous to be able to predict when a specific player is expected to be virtually present without needing to communicate with that player. Furthermore, it would be advantageous to be able to characterize players such that the persistent virtual environment itself can explicitly encourage players with similar temporal profiles to establish an online social relationship. dr

DETAILED DESCRIPTION

One aspect of the technology disclosed herein is that of accumulating a presence history of an entity within a persistent virtual environment by repeated gathering of virtual presence information. The virtual presence information includes an entity identification value and a sampling time value. Once the virtual presence information is collected, the technology performs a general least-squares-fit to a set of basis functions on a portion of the presence history to create a coefficient vector. The coefficient vector represents a temporal profile consistent with the presence history and includes coefficients responsive to the general least-squares-fit. Once the coefficient vector is created, the technology characterizes the entity responsive to its coefficient vector and presents the characterization of the entity.

Another disclosed aspect of the technology is that of accessing a first coefficient vector that represents a first temporal profile and a second coefficient vector that represents a second temporal profile. The first and second temporal profiles represent presence histories of a first entity and a second entity within a persistent virtual environment. Once the coefficient vectors are accessed, the technology generates a predictive function responsive to the coefficient vectors. The predictive function provides a likelihood with respect to a future time that the first entity and the second entity will be temporally compatible. The technology then presents a representation of said predictive function or information derived from said predictive function.

Yet another disclosed aspect accesses coefficient vectors each of which represent an entity within a persistent virtual environment. Each accessed coefficient vector includes coefficients having coefficient values related to the represented entity. The coefficients represent a temporal profile of the entity in the persistent virtual environment. This aspect assigns a coefficient weight to at least one of the coefficients, and partitions the coefficient vectors responsive to the coefficient weight and at least one of the coefficients of each of the coefficient vectors into clusters. Finally, the technology presents a recommendation responsive to the clusters. Furthermore, a compatibility metric can be determined by comparing weighted coefficient vectors of two entities, and the compatibility metric can also be presented.

Figure 1:
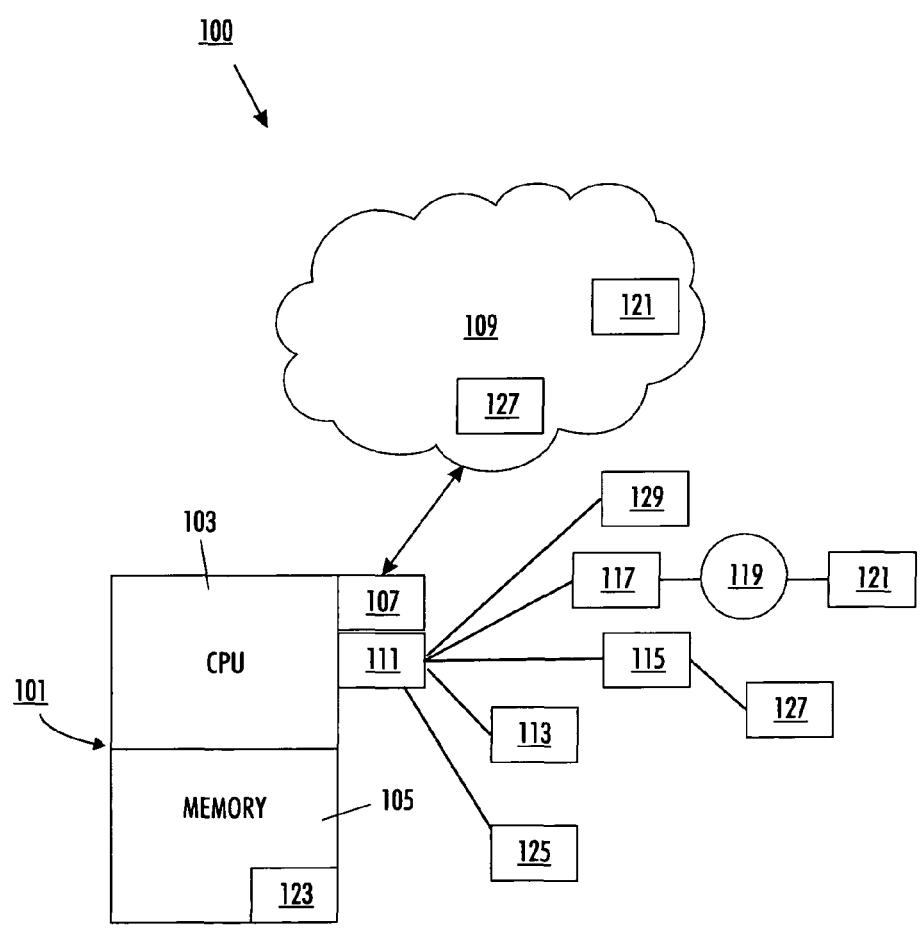
FIG. 1 illustrates a networked computer system in accordance with a preferred embodiment.

FIG. 1 illustrates a networked computer system 100 that can incorporate an embodiment. The networked computer system 100 includes a computer 101 that incorporates a CPU 103, a memory 105, and a network interface 107. The networked interface 107 provides the computer 101 with access to a network 109. The computer also includes an I/O interface 111 that can be connected to a user interface device(s) 113, a storage system 115, and a removable data storage device 117. The removable data storage device 117 can read a computer-usable data carrier 119 (such as a ROM within the device, a replaceable ROM, in a computer-usable data carrier such as a memory stick, CD, floppy, DVD or any other tangible media) that typically contains a program product 121. The user interface device(s) 113 can include a display device 125. The storage system 115 (along with the removable data device 117), the computer-usable data carrier 119, (and in some cases, the network 109) comprise a file storage system. The program product 121 on the computer usable data carrier 119 is generally read into the memory 105 as a program 123 which instructs the CPU 103 to perform specified operations. In addition the program product 121 can be provided from devices accessed using the network 109. Programs and data are commonly read from the tangible physical media (such as those listed above). One skilled in the art will understand that not all of the displayed features of the computer 101 need to be present for all the embodiments that implement the techniques disclosed herein.

Figure 2:
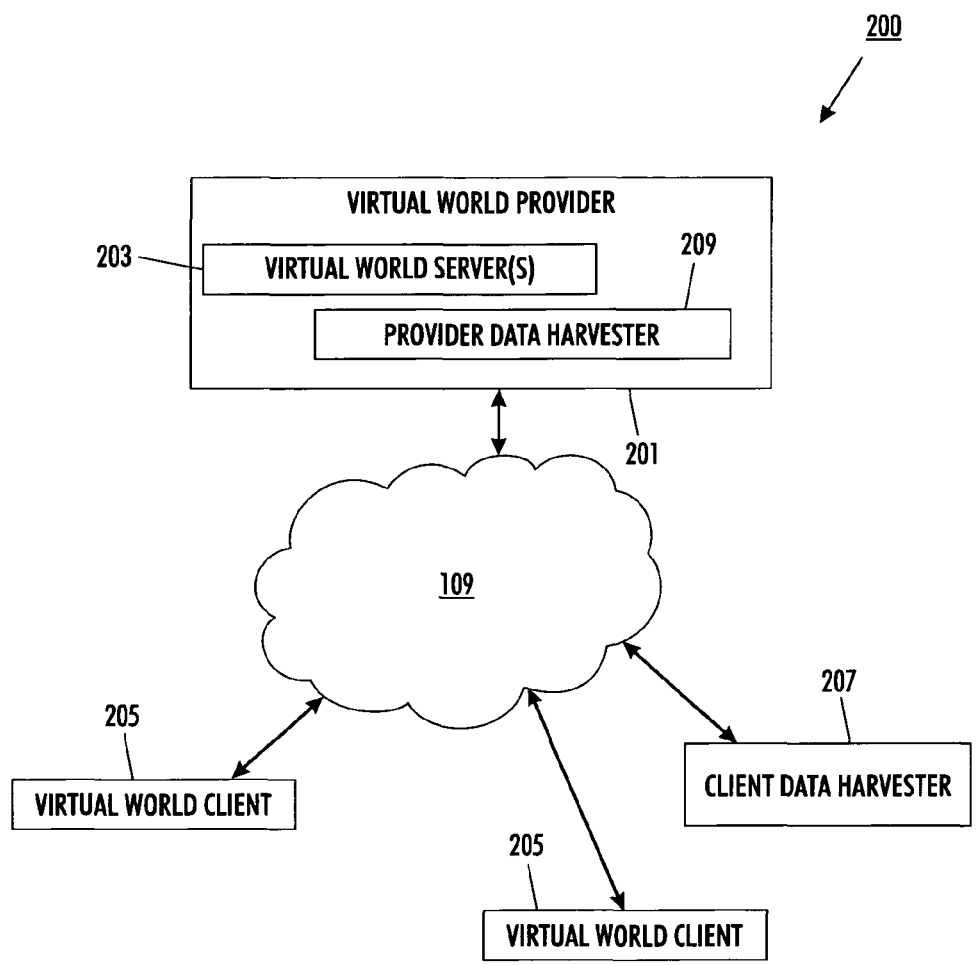
FIG. 2 illustrates a persistent virtual environment.

FIG. 2 illustrates a persistent virtual environment 200 that is made available by a virtual world provider 201 that generally programs, maintains, and controls a virtual world server(s) 203 that provides a simulated environment within which entities can enter and so become virtually present within the persistent virtual environment 200. The simulated environment is a persistent virtual environment in that the simulated environment is maintained by the virtual world provider 201 even if no entities are virtually present within the environment. Some examples of persistent virtual environments are a multiplayer online game, a virtual office, a virtual resort, and a virtual representation of a real world attraction.

A human or computerized robot (the player) can become virtually present within the persistent virtual environment 200 by using a virtual world client 205 to "login" to the persistent virtual environment 200. In this way, the player becomes an entity that controls one or more avatars in the persistent virtual environment 200. The virtual world client 205 communicates over the network 109 to the virtual world server(s) 203 and presents to information about the persistent virtual environment 200 to the player (such as by presenting textual, visual, audio, or other information to the player's senses). The player causes the player's avatar to interact with other players' avatars, with non-player avatars or with virtual objects in the persistent virtual environment 200.

The term "entity" includes one or more of any of the following: a player, an avatar, an account holder, and a player association. An avatar in the persistent virtual environment 200 is a virtual representation of a character played by a player, of a non-player character, a device, tool, landscape or other virtual object with which a player avatar can interact. An account holder has the ability to login and control an avatar and is associated with personally identifiable real word information (for example, name, address, bank account). A player uses the account established by the account holder to control an avatar associated with the account. In addition, a player association (for example, a guild, a clan, a city, other etc.) also can be an entity.

One aspect of the persistent virtual environment 200 is a client data harvester 207 and/or a provider data harvester 209. These data harvesters repeatedly gather virtual presence information as to as to the state of an entity in the persistent virtual environment 200 (for example, whether the entity is virtually present at the time of the harvest or how many (or what percent) of the entities belonging to the player association is virtually present at harvest). When the entity is an avatar, additional information can be harvested such as the avatar's possessions, location, profession, skills, experience, player association attachment etc. When the entity is an account holder, additional information can include the avatar(s) controlled by the account holder, what virtual world server(s) 203 the account holder uses, temporal information when the account holder has any avatar virtually present, etc. The provider data harvester 209 generally can access more private entity information than can the client data harvester 207 because the virtual world provider 201 imposes more access restrictions on client computers such as the client data harvester 207. The term "virtual presence information" includes the time the presence information was acquired as well an any type of entity data acquired by a data harvester, or that can be associated with entity data acquired by a data harvester.

The client data harvester 207 interfaces to the virtual world server(s) 203 through one or more application programming interfaces (API) generally provided or authorized by the virtual world provider 201 (for example, as a programming interface to a specific computer programming language, or as "macros" provided to automate player actions). However, the client data harvester 207 will generally be limited in the number and/or type of interactions it can make to the virtual world server(s) 203. This can limit the amount of virtual presence information that can be captured by the client data harvester 207 and/or can extend the time required to capture the virtual presence information. In addition the client data harvester 207 generally does not have access to any virtual presence information other than that which would be available to a player (for example, the client data harvester 207 does not have access to another's account information). The provider data harvester 209 however does not have the performance restrictions of the client data harvester 207 nor need it be restricted from access to player account information. Furthermore, the provider data harvester 209 can also gather player-style information and determine the probability that the avatar has a history of being controlled by different players.

Figure 3:
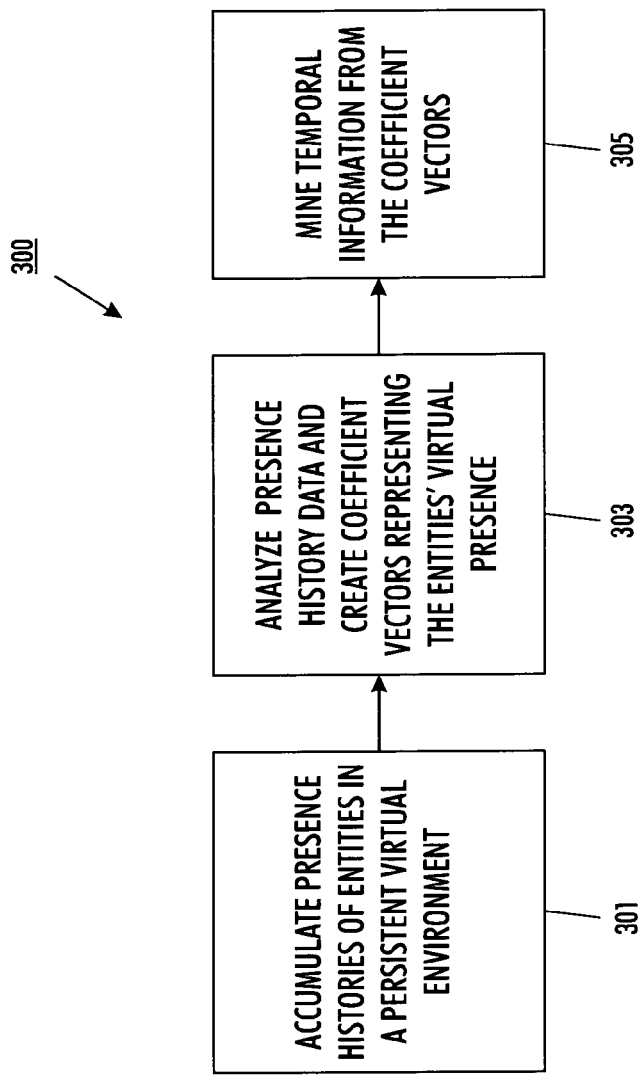
FIG. 3 illustrates an architecture for harvesting virtual presence information related to a persistent virtual environment as shown by FIG. 6.

FIG. 3 illustrates an architecture for harvesting virtual presence information 300 from the persistent virtual environment 200 shown in FIG. 2. An 'accumulate presence history' process 301 accumulates an entity's presence history within a persistent virtual environment by repeatedly acquiring virtual presence information of the entity. The virtual presence information can be stored in memory or in other accessible storage and can include an entity identification value and a sampling time value. In some embodiments, the virtual presence information can include a presence state value (such as whether the entity is virtually present when the presence history is gathered). In the case of player associations for example, the presence state value can include a participation level such as a number or percentage of the player association that are virtually present at the time of acquisition. Furthermore, the presence state value can have a positive or negative value with respect to a threshold.

It is important to note that while the accumulation of the virtual presence information is repeated, in some embodiments (such as those implemented using the client data harvester 207) there can be significant variation in the length of the intervals between successive accumulations. Other embodiments (such as those implemented using the provider data harvester 209) can result in more consistent intervals because the provider data harvester 209 and the virtual world server(s) 203 are both under control of the virtual world provider 201 and need not be limited to API available to a client.

After a sufficient amount of virtual presence information is accumulated, a 'create coefficient vectors' process 303 processes the presence history to create (or update) a coefficient vector that represents a temporal profile consistent with the presence history for any particular entity. The creation of the coefficient vector can result from performing a general least-squares-fit (or other spectral analyses) to a set of basis functions on the virtual presence information gathered for the entity (as is subsequently described with respect to FIG. 10). The set of basis functions serve as a temporal model. The coefficient vector includes the coefficient values that parameterize the temporal profile for the entity's past presence in the persistent virtual environment 200.

Some embodiments store the virtual presence information for an extended period of time (such as years). Other embodiments conflate data generated from the temporal profile corresponding to the coefficient vector with the newly acquired virtual presence information. In some embodiments, the acquired data is subjected to a filter prior to storing the data. In some embodiments, the acquired data is subjected to a filter prior to fitting the data to the temporal model.

In addition to the coefficient vectors representing the entity's temporal profiles, additional information can be acquired about the entity such as an entity presence state value, an entity experience value, an entity class value, an entity profession value, an entity attribute value, an entity clan value, an entity city value, an entity play style value, an entity equipment value, an entity player name, and entity account, an entity online social relationship, an entity characteristic, an entity possession, an entity virtual location, and an entity property. Much of this information does not rapidly change and can be separately gathered and added to the coefficient vectors. Much of this information can characterized with respect to a temporal profile.

A 'mine information' process 305 can classify aspects of the entity, extract and/or develop various types of information about an entity or a set of entities from their respective coefficient vectors. The 'mine information' process 305 can be performed by the virtual world provider 201 when sufficient computational resources exist, during maintenance, or performed in response from a request by an entity, as well as in response to other events and conditions. The 'mine information' process 305 can be performed by the client data harvester 207 when needed.

Figure 4:
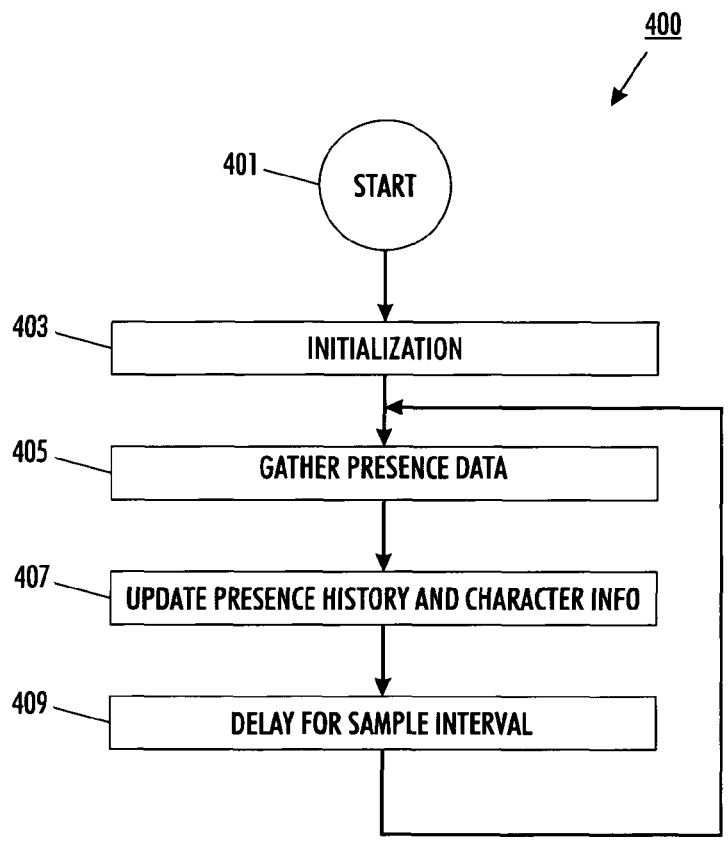
FIG. 4 illustrates a data-acquisition process.

FIG. 4 illustrates a data-acquisition process 400 that can be used by the client data harvester 207 and/or the provider data harvester 209 to accumulate a presence history of entities within the persistent virtual environment 200.

The data-acquisition process 400 initiates at a 'start' terminal 401 responsive to a user command, an automatic initiation, or by an invocation by a local or remote process. The data-acquisition process 400 continues to an 'initialization' procedure 403 that performs any required initialization such as allocating resources, establishing network connections, logging in to the virtual world server(s) 203 etc.

Once operational, the data-acquisition process 400 continues to a 'gather virtual presence information' procedure 405 that can invoke an API or other tool that queries the virtual world server(s) 203 for virtual presence information for entities that are currently present in the persistent virtual environment 200. The returned virtual presence information is then processed by an 'update presence history and entity information' procedure 407 to store the virtual presence information.

Once the data is stored, the data-acquisition process 400 continues to a 'sample interval delay' procedure 409 which causes the data-acquisition process 400 to delay for some time prior to starting the next data acquisition cycle. Over time, the accumulation of virtual presence information provides a presence history for the entities that have existed in the persistent virtual environment 200. Some embodiments allow the newly acquired virtual presence information to be conflated with an existing coefficient vector to reduce the storage requirements for the virtual presence information at the cost of computational overhead. Other embodiments accumulate virtual presence information and periodically conflate that information with the coefficient vectors. Still other embodiments store all of the virtual presence information whenever collected and generates the coefficient vectors from the totality of the saved virtual presence information.

In some embodiments, the virtual presence information includes an entity identification value and a sampling time value. The entity identification value identifies the entity and the sampling time value identifies the time when the entity was determined to be virtually present in the persistent virtual environment 200.

In some embodiments, the virtual presence information is only gathered for entities that are virtually present when the 'gather virtual presence information' procedure 405 executes. In other embodiments, the virtual presence information includes an entity presence state that explicitly captures whether or not the entity is virtually present at the time of the sample (in the case of player associations, the participation level indicates how many (or what percentage of) association member avatars are virtually present).

In some embodiments, the virtual presence information can be stored as a presence state value that represents an interval having a start and end time where the entity is either virtually present or not virtually present during the interval. If this interval information is gathered from a polling embodiment such as illustrated in the data-acquisition process 400, the entity may have logged off and back on during the sampling delay.

In yet other embodiments of the data-acquisition process 400 can accurately capture the presence state value by using an event logger that monitors login and logoff state changes.

One skilled in the art will understand that the functionality of the data-acquisition process 400 can be tightly incorporated into the virtual world server(s) 203 itself and need not be performed on a separate processor or as a separate process. Further, such a one will understand that the data-acquisition process 400 can gather account holder information by associating the avatar with its account. Some account holders allow multiple players to control the avatar associated with the account. Some embodiments can evaluate an avatar's play style to determine which of the multiply authorized players are actually controlling the avatar.

Figure 5:
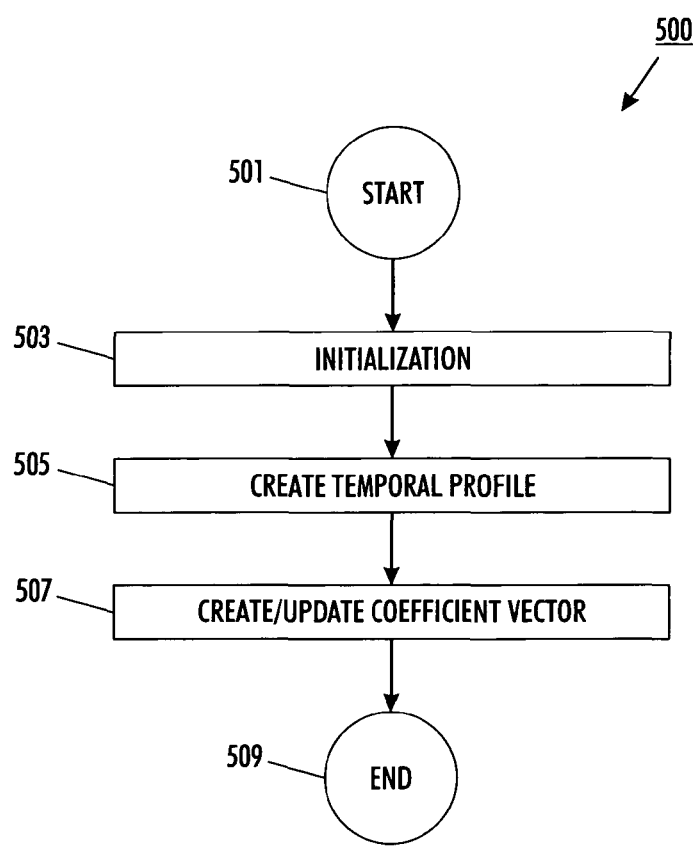
FIG. 5 illustrates a temporal profile creation process.

FIG. 5 illustrates a temporal profile creation process 500 that creates and/or updates a temporal profile for each entity from the virtual presence information accumulated by the data-acquisition process 400 shown in FIG. 4. Once invoked the temporal profile creation process 500 initiates at a 'start' terminal 501 and continues to an 'initialization' procedure 503 to perform any required initialization. Then, a 'create temporal profile' procedure 505 accesses the virtual presence information (stored by the 'update presence history and entity information' procedure 407 of FIG. 4) and performs a general least-squares-fit on the presence history to create a coefficient vector. If a coefficient vector already exists for the entity, a temporal profile consistent with the existing coefficient vector can first be created, and periodic points can be extracted from that temporal profile and conflated with the virtual presence information prior to performing the general least-squares-fit. The general least-squares-fit is subsequently described with respect to FIG. 10 and uses a temporal model to generate temporal coefficients that represent the temporal profile. Once the coefficients are determined, a 'create coefficient vectors' procedure 507 associates a coefficient vector containing the coefficients with the entity. Finally, the temporal profile creation process 500 completes through an 'end' terminal 509.

Some embodiments require that the virtual presence information pass a filter prior to being used fit. Some embodiments will generate explicit not virtually present information if the entity was not explicitly virtually present when the data was acquired (for example, in embodiments where no data is gathered if the entity is not virtually present at the time of the acquisition).

Figure 6:
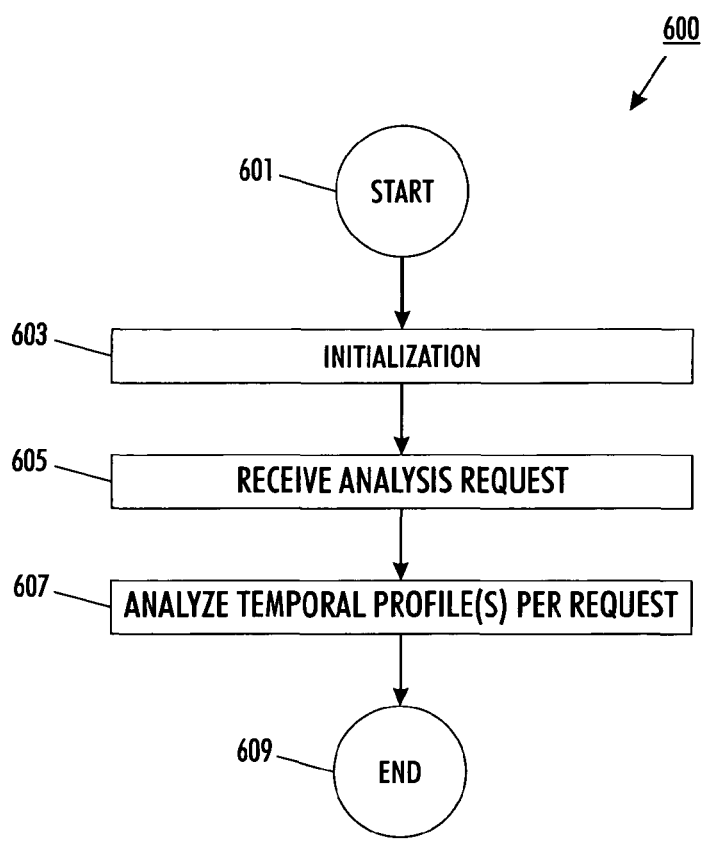
FIG. 6 illustrates a temporal profile analysis process.

FIG. 6 illustrates a temporal profile analysis process 600 that utilizes the coefficient vector to perform temporal profile related analysis to characterize the entity. The temporal profile analysis process 600 initiates at a 'start' terminal 601 and initializes at an 'initialization' procedure 603. A 'receive analysis request' procedure 605 receives a request for a particular type of analysis that can be performed and/or invoked by a 'perform analysis' procedure 607 (example embodiments of which are subsequently described with respect to FIG. 7, FIG. 8, and FIG. 9). After the analysis is completed, the temporal profile analysis process 600 completes through an 'end' terminal 609.

The 'perform analysis' procedure 607 can include, invoke, or cause to be invoked any of a number of analysis processes. One of these analysis processes includes logic to use the coefficient vector to characterize the entity (for example, by characterizing the entity as intermittently virtually present, as virtually present for short periods, as virtually present for long periods, as never virtually present from 10:00pm to 5:00pm local time etc.). The characterization of the entity can be presented in many ways some of which are subsequently described. The characterization of the entity can be accomplished by clustering the entity to fixed known points in an eigenspace using techniques similar to those described with respect to FIG. 12, by comparing the entity's temporal profile to known profile types, by comparing non-temporal coefficients in the coefficient vector to known configurations (which can be heuristically determined).

One way of presenting the characterization of the entity is to present the temporal profile derived from the coefficient vector to a human (such as via display of a graph). Another way to present the characterization of the entity, is to provide the coefficient vector to a program that characterizes it and presents the result, etc.). Another way is to save the characterization of the entity to the storage system 115. Yet another way to present the characterization of the entity is to cause a non-player avatar to present the characterization to the same or different entity. Thus, the temporal profile, the coefficient vector, or information derived from either or both can be presented. To summarize, the meaning of "presentation" includes displaying, storing, printing, processing, using, analyzing etc. that which is being presented.

Another aspect of the technology disclosed herein is of extrapolating the temporal profile into the future to provide a likelihood that the entity associated with the temporal profile will be virtually present at some future time. This likelihood can be presented to other entities for example (in the context where the persistent virtual environment is a MMOG and Rugor is an avatar), as a "Graph of times when Rugor is likely to play next week", or combined and thresholded to propose possible times to schedule coordinated entity interactions. The extrapolation can be conditioned to provide likelihoods that consider, for example, whether targeted situations of interest (such as a quest, a player association gathering, or virtual event (for example, wedding, wake, goodbye party)) have an interaction interval, whether the entities should maximize the overlap between the entities during the interaction interval, whether the proposed possible times are conditioned on the soonest possible time, or whether a required percentage of expected entity participation is needed at the proposed possible times, etc.

For example, using a natural language query such as "I would like to do the quest Razorfen Downs with Rango and Medow. Can you suggest a time?" the technology disclosed herein can analyze the temporal profiles of the entity making the query and the named avatars and extend the temporal profiles into the future. The technology can also obtain information about the time required to compete the quest (the interaction interval—which can be specified by the player or obtained from the persistent virtual environment) and return with a response something like "Razorfen Downs takes approximately 2 hours. Consider proposing Thursday, 8pm [35%-5] or Saturday 11am [49%-10]." The percentages refer to the likelihood that the entities would have all been virtually present by coincidence, even without prearrangement; the number after the hyphen is an indication of the strength of the prediction (here on a scale of 1-10) The strength of the prediction is responsive to the merit values of the temporal profile fittings. Furthermore, the MMOG can provide non-player avatars that a player entity can interact with to request the information and that present the information to the player entity.

For embodiments that do not store the entire virtual presence information, copies of the coefficient vectors can be periodically stored to be able to track changes in the entity's temporal profile.

Figure 7:
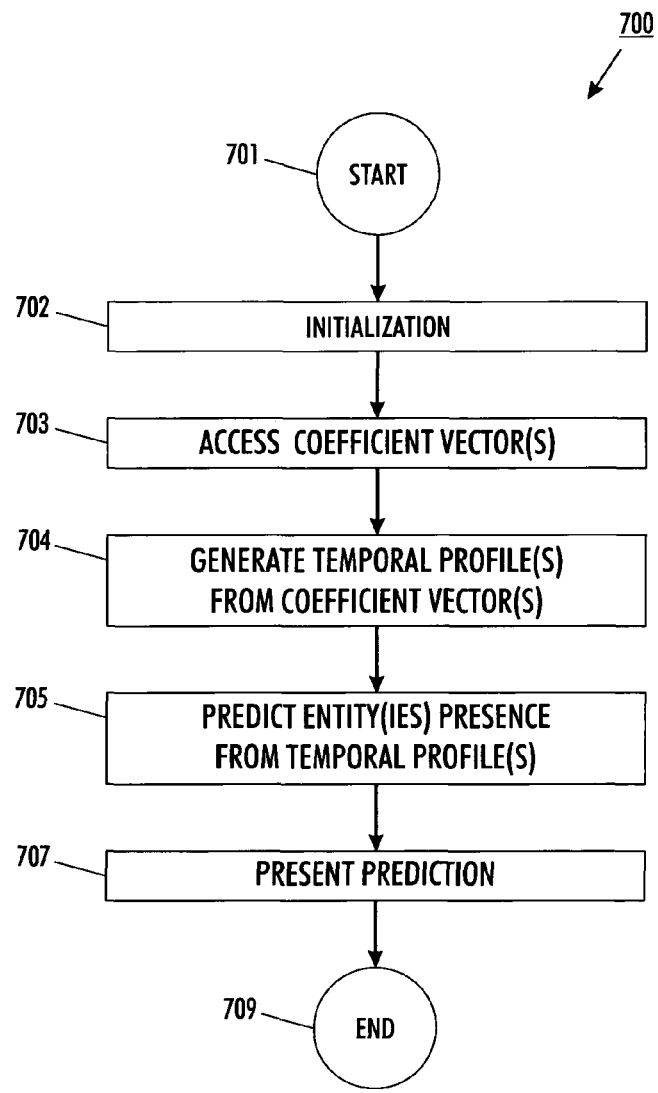
FIG. 7 illustrates an entity presence prediction process.

FIG. 7 illustrates an entity presence prediction process 700 that can be invoked by the 'perform analysis' procedure 607, initiates at a 'start' terminal 701 and is initialized by an 'initialization' procedure 702. Once initialized, an 'access coefficient vectors' procedure 703 obtains the coefficient vectors that represent entities' presence history relevant to the request. A 'create temporal profile' procedure 704 generates the temporal profile(s) of an entity (or set of entities). The generated temporal profile(s) is used by the 'presence prediction' procedure 705 to generate a predictive function (extrapolated from the temporal profile) that returns the likelihood that the entity or entities will be virtually present within the persistent virtual environment 200 at some future time (as is subsequently described with respect to FIG. 11). The 'presence prediction' procedure 705 can also return a confidence value (which is a function of the merit value from the fit of the temporal model to the entity's virtual presence information). By combining two or more coefficient vectors, the entity presence prediction process 700 can provide a likelihood that the respective entities will both be virtually present during some future time. The 'presence prediction' procedure 705 can be conditioned to maximize the likelihood that multiple entities will be simultaneously virtually present for a specified interval (such as the expected time required to complete a quest). A 'presentation' procedure 707 can then present the likelihood generated by the 'presence prediction' procedure 705 after which the entity presence prediction process 700 completes through an 'end' terminal 709.

The 'presence prediction' procedure 705 can, for example, directly present a representation of the predictive function to the entity as a graph or text etc., or can present information derived from the predictive function such as by tasking a non-player avatar (represented as a character or oracle) to interact with and present the information derived from the predictive function to the player's avatar.

Figure 8:
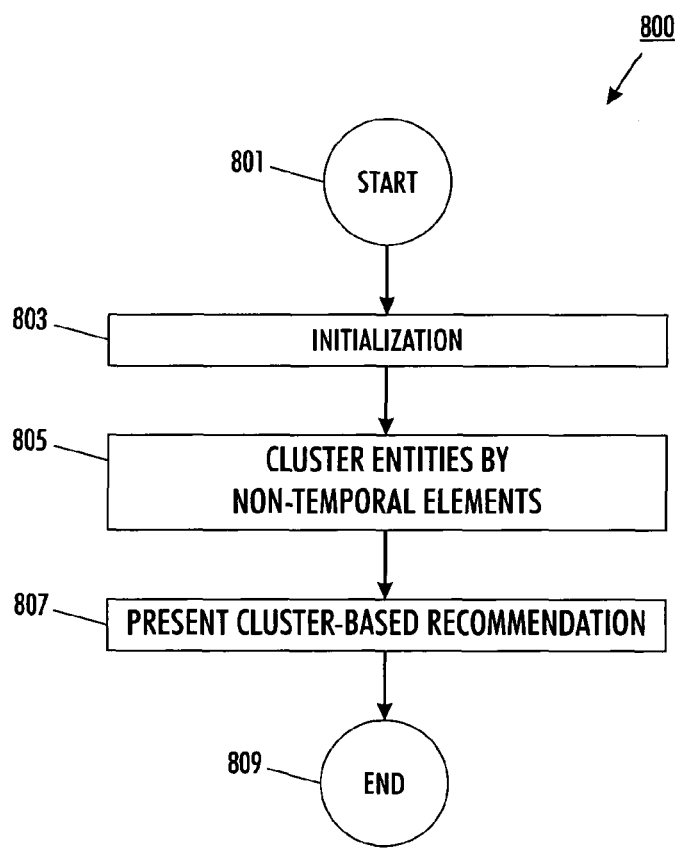
FIG. 8 illustrates a group recommendation process.

FIG. 8 illustrates a group recommendation process 800 that can be used to recommend that entities combine into a player association or that entities be introduced because of the similarity of their temporal profiles. The group recommendation process 800 can be invoked by the 'perform analysis' procedure 607, initiates at a 'start' terminal 801 and is initialized by an 'initialization' procedure 803. Once initialized, the group recommendation process 800 continues to a 'cluster entities' procedure 805 that clusters the entities based on some (or all) of their coefficient vectors as weighted. Clustering is subsequently described with respect to FIG. 12. The results from the 'cluster entities' procedure 805 can be presented as a recommendation. The group recommendation process 800 does not require that the temporal profiles be extended into future time. The existing temporal profiles allow entities to be clustered based on weighted similarity or differences such as when the entities are virtually present in the persistent virtual environment, their play style, and non-temporal entity characteristics (such as: similar, compatible, incompatible, etc.). In particular, the recommendation can suggest that one entity join a player association such as a city, clan, guild etc. (by detecting similarity in the player association's temporal profile with a player entity's temporal profile); can suggest one player entity meet with another player entity because of temporal profile similarities and/or combined with play style (for example as determined from character level, average rate of progression, player's preferred music style, player's aggressiveness, number of entries in the player's "friends list", or other player compatibility). The temporally extended temporal profiles allow predictions of when player entities are likely to be virtually present at the same time. These predictions simplify the scheduling of quests, the scheduling of player association meetings that require a quorum, etc.

The coefficient vectors of different entities can also be used to determine the compatibility of the entities. For example, the temporal aspects of a player entity's coefficient vector can be compared to the temporal aspects of a player association entity's coefficient vector to determine whether the player is virtually present at the same time the player association's participation level is high.

Figure 9:
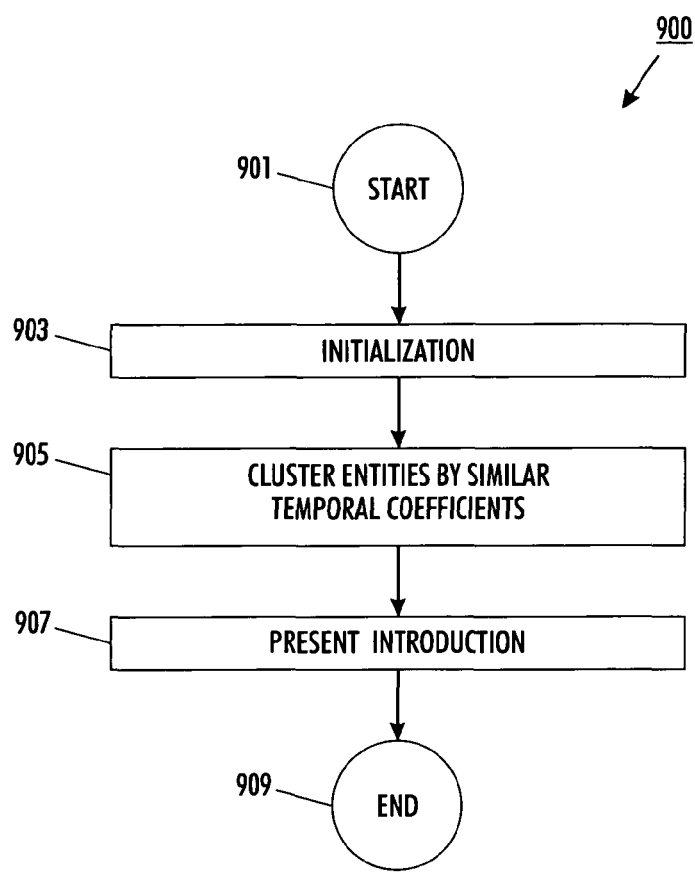
FIG. 9 illustrates an introduction process that can be used to recommend that two or more entities develop online social relationships.

FIG. 9 illustrates an introduction process 900 that can be used to detect a high likelihood that two or more entities are temporally compatible and recommend that these entities develop online social relationships. The introduction process 900 can be invoked by the 'perform analysis' procedure 607, initiates at a 'start' terminal 901, and is initialized by an 'initialization' procedure 903. Once initialized, the introduction process 900 continues to a 'temporally cluster entities' procedure 905 that clusters the entities responsive to coefficients in their coefficient vectors and respective weightings (temporal coefficients and/or non-temporal coefficients—such as entity level, class, profession etc.—can be used to determine the clusters). Once the clusters are determined, a 'provide introduction' procedure 907 presents a recommendation to some or all of the entities in the cluster to each other. The introduction process 900 completes through the 'end' terminal 909. The weightings used to cluster can be attractive or repulsive to enable an entity to receive recommendations tailored to the entity's needs (for example clustering a player's avatar with another avatar having characteristics desired by the player).

The 'provide introduction' procedure 907 can be accomplished by providing a recommendation to clustered entities. Some example recommendations are: by sending e-mails with the recommendation to the account holders to interact with each other, by tasking non-player avatar's to perform introductions to the clustered player entities to effect the recommendation (for example, a non-player avatar can be tasked to locate a player avatar and say "you should really go find Rugor, let me take you to him"), by structuring quests that required the clustered player entities to interact, by providing incentives to a player entity to join a player association, etc. All of these techniques encourage player entities to develop online social relationships.

Figure 10:
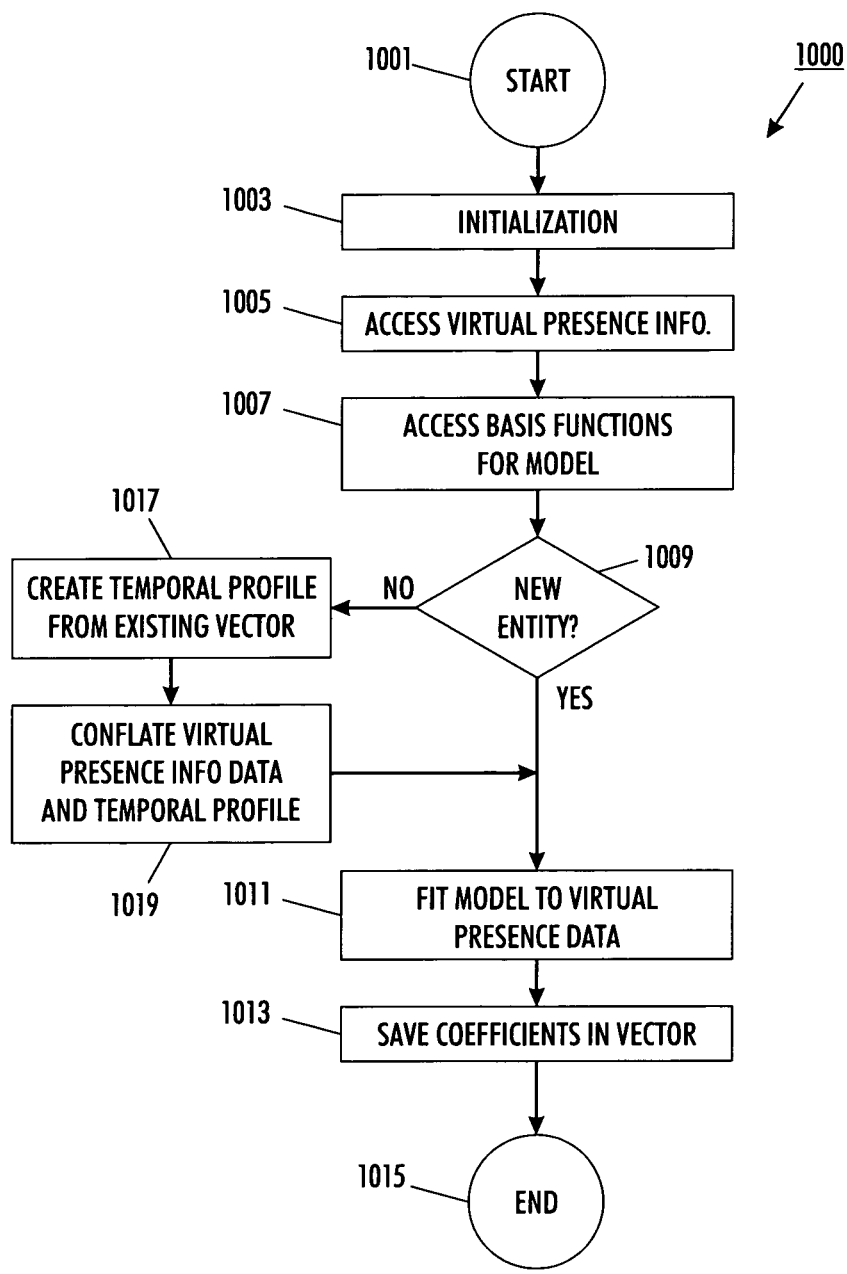
FIG. 10 illustrates a temporal model creation/update process.

FIG. 10 illustrates a temporal model creation/update process 1000 that can be invoked by the 'create temporal profile' procedure 505, initiates at a 'start' terminal 1001 and is initialized by an 'initialization' procedure 1003. The temporal model assumes that an entity's presence in the persistent virtual environment has a cyclic nature. By fitting the temporal model to the virtual presence information in a manner that retains the phase information in the virtual presence information, the virtual presence information can be compressed into coefficients that drive the temporal model.

Once initialized, an access virtual presence information procedure 1005 accesses the virtual presence information stored by the 'update presence history and entity information' procedure 407. An 'access basis functions' procedure 1007 accesses the set if basis functions used for the temporal model. In embodiments that recreate the temporal profile from an existing coefficient vector, a 'new entity' decision procedure 1009 determines if the virtual presence information is related to a known or new entity. If the entity is a new entity, or if the embodiment does not recreate the temporal profile from the coefficient vector, the temporal model creation/update process 1000 continues to a 'fit model' procedure 1011 that uses a general least-squares-fit algorithm to generate a temporal profile for the virtual presence information. In one embodiment, the temporal profile of the entity is characterized by the coefficients to the set of basis function determined by the general least-squares-fit. The General Linear Least Squares fit to a model is well known in the art (see: Section 15.4, Modeling of Data—General Linear Least Squares, *Numerical Recipes in C: The Art of Scientific Computing*, second edition © 1988-1992 Cambridge University Press.). Once the fit is completed, the coefficients are stored in the coefficient vector by a 'save coefficients' procedure 1013. Some embodiments will also store a merit value that represents how well the temporal model fits the virtual presence information. The merit value can also indicate how the fit changes over time, and/or how well the fit matches the data from the more current portion of the virtual presence information. After the coefficients are stored, the temporal model creation/update process 1000 completes through an 'end' terminal 1015.

If at the 'new entity' decision procedure 1009 and if the embodiment does not store all the virtual presence information and a coefficient vector exists for the entity, the temporal model creation/update process 1000 continues to a 'create temporal profile' procedure 1017 that applies the coefficients to the temporal model to generate a temporal profile. Then, a 'conflate temporal profile and virtual presence information' procedure 1019 conflates selected points from the resulting temporal profile with the stored virtual presence information. The temporal model creation/update process 1000 then continues to the 'fit model' procedure 1011 to fit the temporal model to the conflated virtual presence information and eventually completes through the 'end' terminal 1015.

The basis functions can include one or more periodic functions with periods of years, months, weeks, working weeks, weekend weeks, and days; and their harmonics, as well as functions with periods on the order of the sampling period. The set of basis functions can also include event functions which are non-periodic functions that can represent historical response to a change in the persistent virtual environment 200. For example, as new environments are added to the persistent virtual environment 200, player entities tend to increase the amount of time they are virtually present to investigate the new environment.

Figure 11:
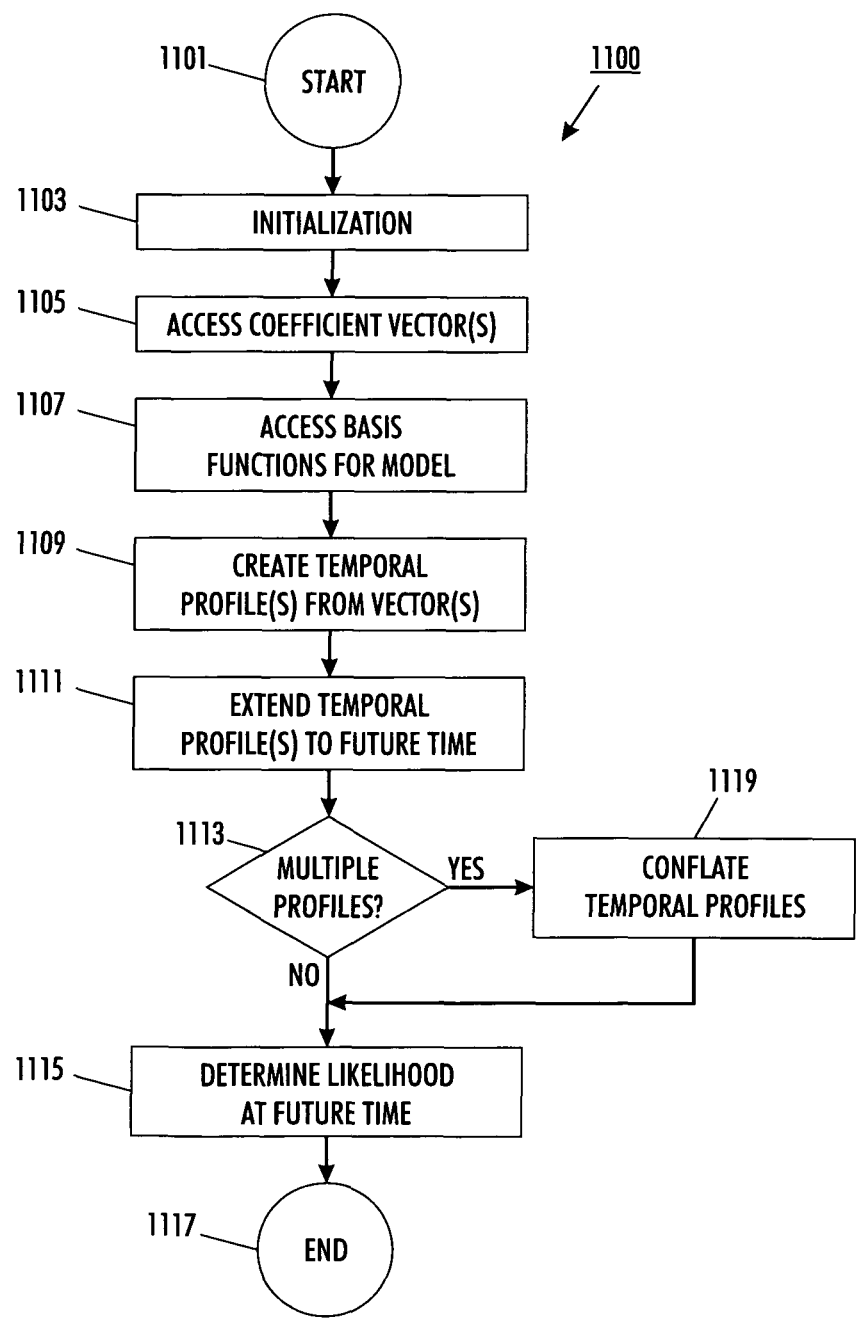
FIG. 11 illustrates a predictive function generation process.

FIG. 11 illustrates a predictive function generation process 1100 that can be invoked by the 'presence prediction' procedure 705, initiates at a 'start' terminal 1101 and is initialized by an 'initialization' procedure 1103. An 'access coefficient vectors' procedure 1105 accesses the provided coefficient vectors. An 'access basis functions' procedure 1107 accesses the basis functions for the temporal model. Then, a 'create temporal profile' procedure 1109 applies the coefficients from each coefficient vector to create a temporal profile for each of the coefficient vectors. Because the temporal profiles are a function of time, they can be extended to a future time. A 'multiple temporal profile' decision procedure 1113 determines whether the likelihood desired is driven by multiple profiles or by a single profile. If driven by a single profile, the predictive function generation process 1100 continues to a 'determine likelihood at future time' procedure 1115 that calculates the likelihood that the entity will be virtually present at some specific time or range of specific times. Then the predictive function generation process 1100 completes through the 'end' terminal 1117.

If at the 'multiple temporal profile' decision procedure 1113 a result is desired that is based on multiple temporal profiles, the predictive function generation process 1100 continues to a 'conflate temporal profiles' procedure 1119 that can perform a number of computations for generating a predictive function that represents the likelihood that the entities will both be present at some future time. One embodiment conflates the predicted temporal profiles and then normalizes the resulting predicted temporal profile. Then the predictive function generation process 1100 continues to the 'determine likelihood at future time' procedure 1115 of the resulting predicted temporal profile. Another embodiment generates the separate temporal profiles and determines future times of maximum temporal profile overlap.

Figure 12:
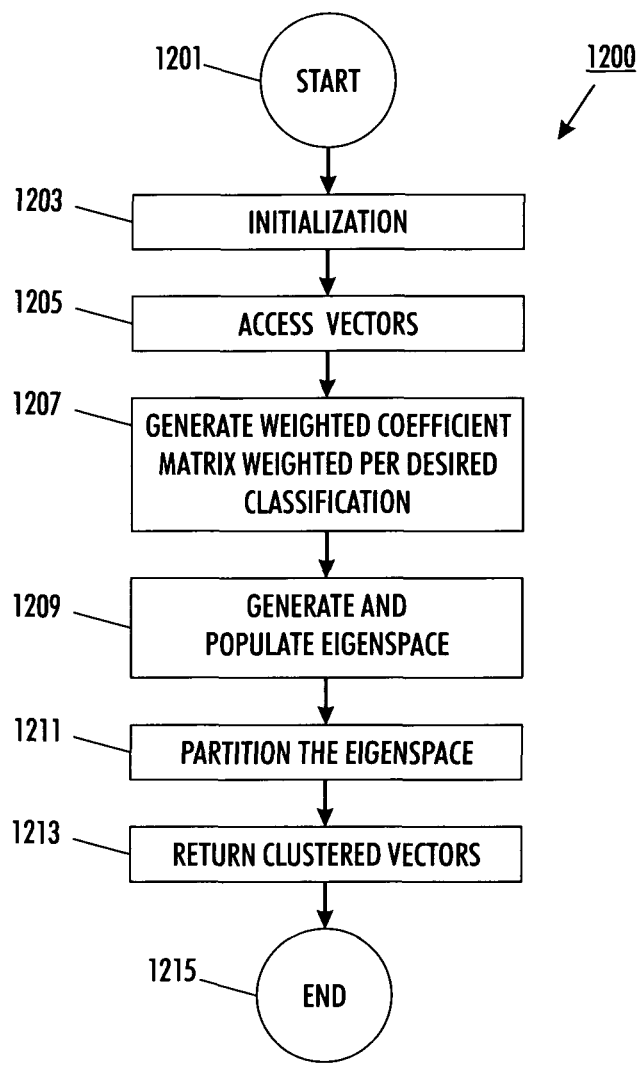
FIG. 12 illustrates a vector clustering process.

FIG. 12 illustrates a vector clustering process 1200 that can be used to identify clusters of entities that have similar (and/or compatible) characteristics (whether temporal profile characteristics, and/or avatar characteristics). The vector clustering process 1200 can be invoked by the 'temporally cluster entities' procedure 905, the 'cluster entities' procedure 805, and/or separately invoked and initiates at the 'start' terminal 1201. The vector clustering process 1200 is initialized by the 'initialization' procedure 1203 and continues to an 'access coefficient vector' procedure 1205 that accesses the coefficient vectors that are being characterized. A 'generate weighted coefficient matrix' procedure 1207 generates a weighted matrix of the relevant coefficients from the provided coefficient vectors and the provided weights for the particular characterization (some of these weights can be specified by the entity). A 'generate eigenspace' procedure 1209 calculates the eigenvectors for the weighted matrix, generates an eigenspace based on the eigenvectors and transforms the coefficient vectors into the eigenspace. A 'partition eigenspace' procedure 1211 then partitions the eigenspace to determine the clusters. The coefficient vector clusters can be returned by, a 'return clustered vectors' procedure 1213 after which the vector clustering process 1200 completes through an 'end' terminal 1215. Similar clustering can be used to suggest group memberships for quests. Furthermore, a player can compare the coefficient vectors of two entities to generate a compatibility metric for the entities. Thus the player can determine how his/her compatibility has changed with another entity.

One skilled in the art will understand that virtual time is not the same as a player's real world time. Such a one will also understand that real world times for different entities are different in different time zones, for daylight savings time zones, and that appropriate transformations of time are needed to gather, use, and present time to the players. A typical reference time would be GMT or UTC.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any other logic.

One skilled in the art will understand that the network propagates information (such as informational data as well as data that defines a computer program). The information can also be embodied within a carrier-wave. The term "carrier-wave" includes electromagnetic signals, visible or invisible light pulses, signals on a data bus, or signals transmitted over any wire, wireless, or optical fiber technology that allows information to be propagated over a network. Programs and data are commonly read from both tangible physical media (such as a compact, floppy, or magnetic disk) and from a network. Thus, the network, like a tangible physical media, is a computer-usable data carrier.

One skilled in the art will understand that the procedures described herein, when implemented on a general purpose computer, can be implemented as one or more tasks or threads; can use procedural programming techniques, object-oriented programming techniques, or other programming techniques; that there are many possible embodiments that one skilled in the art would consider to be equivalent to the embodiment described herein; and that the structure of the described embodiments in no way limits the technology as claimed.

One skilled in the art will understand that the technology enables temporal profiling of entities in a persistent virtual environment; enables determination of a predictive function that allows one entity to obtain likelihoods that another entity will be virtually present at some future time. Further, the technology also allows an entity to more simply detect other entities that have similar temporal profiles and to encourage the development of online social relationships between temporally compatible entities. In addition, the technology allows entities to be grouped by temporal play style.

From the foregoing, it will be appreciated that the technology has (without limitation) the following advantages:

1) it simplifies the establishment of online social relationships by simplifying the ability to determine when entities have compatible play styles.
2) it simplifies the determination of when an entity is compatible with a player association.
3) it provides the ability to compress the presence history of an entity by modeling the entity's presence history and maintaining the model's coefficients.
4) it allows the persistent virtual environment provider to encourage players with similar temporal profiles to join the same server, or to join the same instanced region of a persistent virtual environment to maximize social cohesion and/or encourage development of online social relationships; or to encourage players to join servers or instances composed of players having dissimilar temporal profiles to achieve load balancing.
5) it allows the persistent virtual environment to assist a player in selection of a player association such as a guild or clan by maximizing the overlap of the player's temporal profile with the player association's activity.
6) it allows the persistent virtual environment provider to compress virtual presence information into a coefficient vector that represents a temporal profile.
7) it allows predictions of the number of entities that have interrelated online social relationships at some future time.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed follows:

1. A computer controlled method comprising:
  accumulating, by a computer, a presence history of an entity within a persistent virtual environment by repeated gathering of virtual presence information, the virtual presence information comprising an entity identification value and a sampling time value;
  processing, by the computer, the presence history by performing a general least-squares-fit to a non-periodic event function that models a historical response to a determinable modification to the persistent virtual environment, wherein performing the general least-squares-fit produces a coefficient vector that represents a temporal profile consistent with the presence history, said coefficient vector comprising a plurality of coefficients whose values parameterize the temporal profile for the entity's past presence in the persistent virtual environment responsive to the determinable modification to the persistent virtual environment;
  characterizing, by the computer, the entity's temporal profile based on the coefficient vector; and
  presenting, to the entity, a graph illustrating the characterization of the entity's temporal profile.

2. The computer controlled method of claim 1, wherein said entity is one or more of the group consisting of a player, an avatar, an account holder, and a player association.

3. The computer controlled method of claim 1, wherein characterizing said entity comprises determining, as said characterization, a likelihood responsive to said coefficient vector that said entity will be virtually present at a future time.

4. The computer controlled method of claim 3, wherein determining said likelihood further comprises extending said temporal profile to said future time.

5. The computer controlled method of claim 1, wherein said entity is a player association and wherein characterizing said player association comprises: determining, as said characterization, a participation level of said player association responsive to said coefficient vector at a future time.

6. The computer controlled method of claim 1, wherein characterizing said entity further comprises determining, as said characterization, one or more of the group consisting of an entity presence state value, an entity experience value, an entity class value, an entity profession value, an entity attribute value, an entity clan value, an entity city value, an entity play style value, an entity equipment value, an entity player name, an entity account, an entity online social relationship, an entity characteristic, an entity possession, an entity virtual location, and an entity property, with respect to said temporal profile.

7. The computer controlled method of claim 1, wherein said persistent virtual environment is selected from one or more of the group consisting of a multiplayer online game, a virtual office, a virtual resort, and a virtual representation of a real world attraction.

8. The computer controlled method of claim 1, wherein presenting said characterization further comprises presenting said temporal profile.

9. The computer controlled method of claim 1, wherein presenting said characterization further comprises presenting information derived from said temporal profile or said coefficient vector.

10. The computer controlled method of claim 1, further comprising adding to said coefficient vector one or more of the group consisting of an entity presence state value, an entity experience value, an entity class value, an entity profession value, an entity attribute value, an entity clan value, an entity city value, an entity play style value, an entity equipment value, an entity player name, an entity account, an entity online social relationship, an entity characteristic, an entity possession, an entity virtual location, and an entity property.

11. An apparatus having a central processing unit (CPU) and a memory coupled to said CPU comprising:
   a data acquisition logic configured to accumulate a presence history of an entity within a persistent virtual environment by repeated gathering of virtual presence information, the virtual presence information comprising an entity identification value and a sampling time value;
   a fitting logic configured to:
      process the presence history by performing a general least-squares-fit to a non-periodic event function that models a historical response to a determinable modification to the persistent virtual environment;
      wherein performing the general least-squares-fit produces a coefficient vector that represents a temporal profile consistent with the presence history, said coefficient vector comprising a plurality of coefficients whose values parameterize the temporal profile for the entity's past presence in the persistent virtual environment responsive to the determinable modification to the persistent virtual environment;
   a characterization logic, responsive to the fitting logic, configured to characterize the entity's temporal profile based on the coefficient vector; and
   a presentation logic, responsive to the characterization logic, configured to present, to the entity, a graph illustrating the characterization of the entity's temporal profile.

12. The apparatus of claim 11, wherein said entity is one or more of the group consisting of a player, an avatar, an account holder, and a player association.

13. The apparatus of claim 11, wherein the characterization logic comprises a future likelihood logic configured to determine a likelihood responsive to said coefficient vector that said entity will be virtually present at a future time.

14. The apparatus of claim 13, wherein the future likelihood logic comprises forecasting logic configured to extend said temporal profile to said future time.

15. The apparatus of claim 11, wherein said entity is a player association and wherein the characterization logic further comprises: a prediction logic configured to determine a participation level of said player association responsive to said coefficient vector at a future time.

16. The apparatus of claim 11, wherein said persistent virtual environment is selected from one or more of the group consisting of a multiplayer online game, a virtual office, a virtual resort, and a virtual representation of a real world attraction.

17. The apparatus of claim 11, wherein the presentation logic further comprises a profile logic configured to present said temporal profile.

18. The apparatus of claim 11, wherein the presentation logic further comprises analysis logic configured to present information derived from said temporal profile or said coefficient vector.

19. A non-transitory computer-readable storage medium storing instructions that, when executed by a computer, cause said computer to perform a method, the method comprising:
   accumulating a presence history of an entity within a persistent virtual environment by repeated gathering of virtual presence information, the virtual presence information comprising an entity identification value and a sampling time value;
   processing the presence history by performing a general least-squares-fit to a non-periodic event function that models a historical response to a determinable modification to the persistent virtual environment,
   wherein performing the general least-squares-fit produces a coefficient vector that represents a temporal profile consistent with the presence history, said coefficient vector comprising a plurality of coefficients whose values parameterize the temporal profile for the entity's past presence in the persistent virtual environment responsive to the determinable modification to the persistent virtual environment;
   characterizing the entity's temporal profile based on the coefficient vector; and
   presenting, to the entity, a graph illustrating the characterization of the entity's temporal profile.

20. The storage medium of claim 19, wherein said entity is one or more of the group consisting of a player, an avatar, an account holder, and a player association.

21. The storage medium of claim 19, wherein characterizing said entity comprises determining, as said characterization, a likelihood responsive to said coefficient vector that said entity will be virtually present at a future time.

22. The storage medium of claim 21, wherein determining said likelihood further comprises extending said temporal profile to said future time.

23. The storage medium of claim 19, wherein said entity is a player association and wherein characterizing said player association comprises: determining, as said characterization, a participation level of said player association responsive to said coefficient vector at a future time.

24. The storage medium of claim 19, wherein characterizing said entity further comprises determining, as said characterization, one or more of the group consisting of an entity presence state value, an entity experience value, an entity class value, an entity profession value, an entity attribute value, an entity clan value, an entity city value, an entity play style value, an entity equipment value, an entity player name, an entity account, an entity online social relationship, an entity characteristic, an entity possession, an entity virtual location, and an entity property, with respect to said temporal profile.

25. The storage medium of claim 19, wherein said persistent virtual environment is selected from one or more of the group consisting of a multiplayer online game, a virtual office, a virtual resort, and a virtual representation of a real world attraction.

26. The storage medium of claim 19, wherein presenting said characterization further comprises presenting said temporal profile.

27. The storage medium of claim 19, wherein presenting said characterization further comprises presenting information derived from said temporal profile or said coefficient vector.

* * * * *